United States Patent [19]

Gnyra

[11] Patent Number: 4,873,209
[45] Date of Patent: Oct. 10, 1989

[54] INSULATING LIGHTWEIGHT REFRACTORY MATERIALS

[75] Inventor: Bohdan Gnyra, Kingston, Canada

[73] Assignee: Alcan International Limited, Montreal, Canada

[21] Appl. No.: 208,255

[22] Filed: Jun. 17, 1988

[30] Foreign Application Priority Data

Jun. 26, 1987 [CA] Canada .................................. 540710

[51] Int. Cl.$^4$ .............................................. C04B 35/82
[52] U.S. Cl. ...................................... 501/95; 501/123; 501/125; 501/128; 501/133
[58] Field of Search .................. 501/95, 123, 125, 128, 501/133

[56] References Cited

U.S. PATENT DOCUMENTS

| | | | |
|---|---|---|---|
| Re. 31,589 | 5/1984 | Phoenix et al. | 75/27 |
| 3,558,591 | 1/1971 | Yendrek | 260/17.2 |
| 3,567,667 | 3/1971 | Rumbold | 260/17.2 |
| 4,069,859 | 1/1978 | Nagai et al. | 164/56 |
| 4,174,331 | 11/1979 | Myles | 260/29.1 R |
| 4,248,752 | 2/1981 | Myles | 260/29.1 R |
| 4,257,812 | 3/1981 | Johnson et al. | 106/67 |
| 4,366,255 | 12/1982 | Lankard | 501/95 |
| 4,430,121 | 2/1984 | Shima | 75/96 |
| 4,455,246 | 6/1984 | Schmidt et al. | 501/95 X |
| 4,506,025 | 3/1985 | Kleeb et al. | 501/133 X |
| 4,681,819 | 6/1984 | Gnyra | 428/697 |
| 4,773,470 | 9/1988 | Libby et al. | 164/487 |

FOREIGN PATENT DOCUMENTS

| | | | |
|---|---|---|---|
| 0040624 | 4/1975 | Japan | 501/133 |
| 1278473 | 6/1972 | United Kingdom | 501/133 |

OTHER PUBLICATIONS

"Methods for Upgrading Common Silicate Refractories and Foundry Iron Implements Against the Attack by Molten Aluminum Alloys", B. Gnyra-Published in Light Metals, 1986, p. 797.

*Primary Examiner*—William R. Dixon, Jr.
*Assistant Examiner*—Karl Group
*Attorney, Agent, or Firm*—Cooper & Dunham

[57] ABSTRACT

Insulating lightweight refractory materials which are resistant to attack by molten metals, particularly molten aluminum and its alloys and compositions used to form such materials. The materials are settable compositions which comprise a mixture of ceramic fibers, wollastonite powder and aqueous colloidal silica having a solids content of about 5–25% and preferably 12–15% by weight. The weight ratio of the ceramic fibers to the wollastonite powder is 0.8–1.2:1.5–2.5, respectively. The composition optionally contains carbon fibers or metal fibers as reinforcements. The composition can be cast to form shaped products or used as a joining material or as a "face-off" material to protect an underlying article. When dried, the composition forms a material which is insulating, light-weight and resistant to high temperature and chemical attack by metals. The material can be made even more resistant to attack by a silicate and/or fluoride surface treatment. The material is useful for forming items used in metal foundries and the like.

27 Claims, 1 Drawing Sheet

INSULATING LIGHTWEIGHT REFRACTORY MATERIALS

BACKGROUND OF THE INVENTION

I. FIELD OF THE INVENTION

This invention relates to insulating lightweight refractory materials and to compositions used to form such materials. More particularly, the invention relates to insulating lightweight refractory materials which are resistant to attack by molten metals, especially to molten aluminum and its alloys.

II. DESCRIPTION OF THE PRIOR ART

During the production of metals such as aluminum, zinc, lead, copper, tin and their alloys, and during the casting of shaped articles from such metals, various implements and structures come into direct contact with the molten metals and must be able to resist the consequent high temperatures and chemical attack. The implements and structures should also preferably be fairly good heat insulators in order to avoid rapid cooling of the molten metals. In order to provide the necessary properties, the implements and structures are often made out of ceramic materials or have protective ceramic coatings. Ceramic-type refractories have good resistance to high temperature but may be susceptible to thermal stress cracking or to chemical attack by molten metals. For example, molten aluminum is fairly reactive with silicate-containing refractory materials, and certain aluminum alloys (notably 4.5% Mg/Al and 2.5% Li/Al) are extremely chemically aggressive. These metals tend to form destructive $Al-Si-Al_2O_3$ cermets from silicate refractories.

In order to counteract this destructive process, the usual practice has been to use various washes and coatings to protect the exposed refractory surfaces. Examples of such washes and coatings are mica wash, wollastonite, boneash, zirconia, thoria, titania and, recently, various carbides and nitrides. These however adhere only slightly to the surface to be protected and eventually find their way into the processed metal as undesirable impurities.

There is consequently a need for a highly insulating, light refractory material having improved resistance to molten aluminum and other related molten metals, and for a composition used to form such materials.

SUMMARY OF THE INVENTION

The invention provides a settable composition which comprises a mixture of ceramic fibres, wollastonite powder, and aqueous colloidal silica having a solids content of about 5–25% by wt., wherein the weight ratio of the ceramic fibres to the wollastonite powder is 0.8–1.2:1.5–2.5, respectively.

The invention also provides to a refractory material formed by allowing the settable composition to harden and dry.

DETAILED DESCRIPTION OF THE INVENTION

Figure 1:
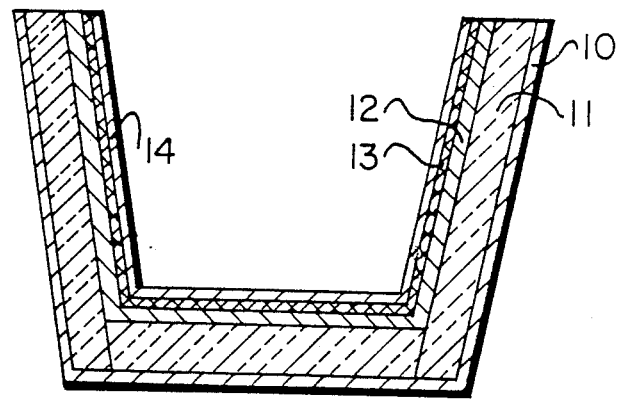
FIG. 1 is a cross-section of a metal-conveying trough having a structure including a surface protecting material of the invention.

The composition of the invention (which has been given the coined name "BGLM" mix) also preferably comprises vermiculite particles and may additionally include reinforcing materials such as carbon fibres or metal fibres, e.g. steel fibres.

The preferred weight ratio of ceramic fibres to wollastonite powder in the composition is about 1:2, respectively. When vermiculite is employed, the ratio of ceramic fibres:wollastonite powder:vermiculite is normally 0.8–1.2:1.5–2.5:0.25–1.75, respectively and preferably about 1:2:0.5.

Although the colloidal silica may contain 5–25% by weight of solids, as indicated above, a more preferred range is 10–17% by weight and the most preferred range is 12–15% by weight. If the solids (silica) content is less than 5%, the final refractory material is unacceptably fragile because the colloidal silica has poor binding characteristics. Solids contents in the range of 5–10% give a refractory material that may be durable enough for some applications, but a solids content of 12% or more produces a very durable material. However, if the solids content is too high (above 25% by wt.), the resulting material contains too much free silica which may be attacked by molten metals, and the refractory may be weakened by silica recrystallization during high temperature operation. The range of 17–25% by weight may give an acceptable product for some applications but the preferred maximum amount is about 15% by weight.

Colloidal silica is an aqueous colloid of extremely fine silica particles which dry to form $SiO_2.2H_2O$. The silica may be partially hydrated to silicic acid. Colloidal silica is a commercially-available product and has a milky appearance. The commercial product normally has a solids content of about 25–30% by weight and is preferably diluted with an equal volume of water prior to use in the present invention to give formulations in the preferred 12–15% range mentioned above. Suitable commercial products include the colloidal silica sold under the trade mark LUDOX by the Du Pont Company, particularly LUDOX HS-40 and SM (negatively charged colloidal silica sols).

The ceramic fibres employed in the present invention are preferably made of aluminum silicate ($Al_2O_3.SiO_2$) and are generally formed from molten kaolin. The fibres are desirably chopped to a length of about ¼ inch (0.635 cm) or less. Suitable fibres include those sold under the trade mark FIBERFRAX by The Carborundum Company and those sold under the trademark KAOWOOL by B&W Co. The chemical and physical properties of FIBERFRAX bulk fibres are as follows:

| | |
|---|---|
| $Al_2O_3$ | 51.9% by weight |
| $SiO_2$ | 47.9% by weight |
| $Na_2O$ | 0.08% by weight |
| $Fe_2O_3$ | 0.1% by weight |
| leachable chlorides | <10 ppm |
| colour | white |
| continuous use limit | 1260° C. |
| melting point | 1790° C. |
| fibre diameter | 2–3 microns (mean) |
| fibre lengths | up to 50 mm |
| specific gravity | 2.73 g/cm$^3$ |

Wollastonite powder comprises acicular natural crystals of calcium silicate ($CaO.SiO_2$), and this material from any suitable source may be used in the present invention. No preliminary treatment of this material needs to be carried out.

Vermiculite is a complex hydrated aluminum-iron-magnesium silicate mineral. The heat expanded particles are preferably screened and/or milled (flaked) prior to use in the present invention. Low alkali content vermiculite (4% by weight or less of alkali, usually $K_2O$ or $Na_2O$) is preferred. The vermiculite is preferably screened or milled prior to use and the desired particle size is usually minus 6 to plus 28 Tyler mesh.

Carbon fibres, when employed, generally have a length between about $\frac{1}{4}$ and $\frac{1}{2}$ inch, and steel fibres, when employed, generally have a length of $\frac{1}{2}$–1 inch. Preferably, the thickness of the carbon or steel fibres ranges from 3–30 microns. The amount of these fibres in the refractory material should be kept fairly small, e.g. 1–5% by weight, particularly 1–2% by weight for the carbon fibres and 3–5% by weight for the steel fibres.

Carbon fibres tend to stiffen the material before it dries and provide a considerable mechanical reinforcement, even though fibres close to the metal-contacting surface may burn off, leaving a non-harmful fine porosity. Steel fibres provide reinforcement against gross cracking and impact breaking.

The composition hardens and dries adequately at ambient temperature but moderately elevated temperatures may be employed if desired to accelerate the setting process. When hardened sufficiently, the material is preferably dried by heating it up to high temperatures. When dried, the material surprisingly attains high strength and good resistance to chemical attack by molten aluminum and aluminum alloys as well as other metals e.g. zinc, lead, copper, tin and their alloys.

The refractory composition of the invention can be cast to form shaped products, for example diptubes (including those larger than 2 inches in diameter that are otherwise difficult to produce), floats, hottops, control pins, or it can be used as a joining (cementing material) or surface finishing material to form a protective coating layer over other materials acting as supporting substrates. Advantageously, the cast products are machinable.

The following BGLM formulation has been found useful for casting small items:

| | |
|---|---|
| ceramic fibres | 250 g |
| wollastonite powder | 500 g |
| screened vermiculite | 100 g |
| colloidal silica (commercial product containing 25–30% by weight solids diluted 50/50 by volume with water) | 500–600 ml |
| carbon fibres (optional) | 10 g |

For the casting of large items, the following formulation is found to be more suitable:

| | |
|---|---|
| ceramic fibres | 250 g |
| wollastonite powder | 500 g |
| screened vermiculite | 100 g |
| colloidal silica (commercial product containing 25–30% by weight solids diluted 50/50 by volume with water) | 600–700 ml |
| steel fibres | 25 g |
| carbon fibres (optional) | 10 g |

For the preparation of dense joining and surface finishing (face-off) mixes, the following formulations are satisfactory for two coat applications:

| | | |
|---|---|---|
| first coat: | ceramic fibres | 250 g |
| | wollastonite powder | 500 g |
| | milled vermiculite | 100 g |
| | colloidal silica (commercial product containing 25–30% by weight solids diluted 50/50 by volume with water) | 500–700 ml |
| | steel fibres | 35 g |
| second coat: | as for the first coat but without the steel fibres. | |

The batch sizes can of course be increased by increasing the amounts of the ingredients while maintaining the relative proportions constant.

In general, increasing the amount of screened vermiculite tends to decrease the density (and hence the thermal conductivity of the material). The use of milled vermiculite instead of screened vermiculite substantially increases the density and the strength of the final cast. Denser materials are also obtained by increasing the relative amounts of wollastonite in the mixture as well as making the mixes less fluid by decreasing the amount of colloidal silica binder.

The ingredients of the composition are preferably mixed together very thoroughly e.g. by using a blender-mixer (Hobart-type) or other suitable mixing apparatus. The solid powders are normally first mixed together and then the premixed solids are added to the colloidal silica and the mixing is continued for an additional 5 to 10 minutes.

The casting of diptubes, floats, control pins, etc. is preferably carried out in a "breathable" plastic or rubber moulds that allows free passage of moisture when the moulded articles are setting (hardening) and drying either at room temperature or at moderately elevated temperatures (e.g. up to about 50° C.). The partially dried hard-set articles are then removed from the moulds and slowly dried by heating them gradually up to about 400° C.–600° C. before contacting them with molten metals. After being fully dried they can be used with molten metals at temperatures up to 800°–900° C., although the operating temperature is more preferably about 750° C. (i.e. when used with molten aluminum and aluminum alloys).

Although the refractory materials obtained from the BGLM composition of the present invention are useful without any further treatment, it has been found that the strength of the materials and their resistance to attack by molten metals are improved to an entirely unexpected extent by the application of a magnesium-silicon-fluoride solution or our "SNF" treatment disclosed in our U.S. Pat. No. 4,681,819, issued on July 21, 1987.

In more detail, the refractory materials of the invention when fully set and dried are desirably surface treated with an aqueous solution of $MgSiF_6.6H_2O$ by immersion, brushing or spraying. The complex fluoride partially reacts with the refractory material making it harder, stronger and more resistant to chemical attack. The solution normally contains about 250 g $MgSiF_6.6H_2O$ per liter of water. Optionally, the material surface is also coated with a mixture of a refractory powder in colloidal silica prior to or after the fluoride treatment. The coating may be applied by hand or by spraying and dried either overnight at room temperature or for a few hours in a stream of hot air having a temperature up to about 100° C.

A typical refractory powder mixture suitable for this treatment contains (by weight)

| milled aluminum silicate fibres | 1 part |
|---|---|
| milled α-Al$_2$O$_3$ | 1 part |
| calcium silicate (wollastonite) | 1 part |
| kaolin | 0.3 part |

One kg of the above powder mixture requires between 0.5 liter and 1.0 liter of colloidal silica having a solids content of about 12–15% by weight. This mixture forms a relatively fluid slurry that can be applied to the material surface by brush or spray. When dry, this coating is normally subjected to the fluoride treatment.

It is believed that the fluoride exerts its protection by the following effect. The relatively unstable MgSiF$_6$.6-H$_2$O readily decomposes on heating to form highliy stable MgF$_2$ refractory and a highly reactive light SiF$_4$ gas. A considerable part of the latter is thought to react with the elements of the refractory material resulting in the formation of a topaz-type Al$_2$SiO$_3$.F(OH)$_2$, which is a refractory material known to be very resistant to molten metal attack.

The use of the BGLM refractory material of the invention as a surface application material followed by the fluoride or a full "SNF" treatment indicated above, is of particular interest. This enables the surfaces of highly insulating materials, e.g. vermiculite boards, to be protected by a very strong, thin layer (e.g. about ¼ inch) of a corrosion-resistant material.

The accompanying drawings show particular applications for the composition of the invention.

The trough of FIG. 1 comprises a steel casing 10 lined with insulating vermiculite boards 11. A ceramic fiber blanket 12 overlies the insulating board and is covered by a steel mesh screen 13. A layer 14 of the material of the invention containing no steel fibres is coated by hand over the steel mesh and subjected to the hardening and "SNF" surface protecting treatment indicated above.

Figure 2:
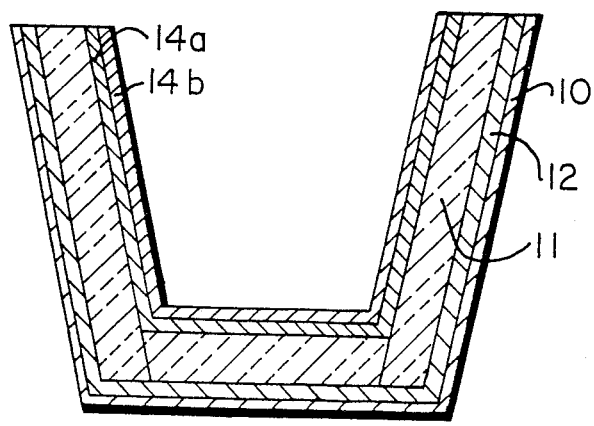
FIG. 2 is a cross-section of a metal-conveying trough having an alternative structure.

In FIG. 2, there is no steel mesh screen and instead the material of the invention is applied by hand in two steps to form two layers 14a and 14b. The underlying layer 14a contains steel fibres for internal support and the overlying layer 14b contains no steel fibres to avoid contact between the steel and the molten metal conveyed by the trough. In this embodiment, the blanket 12 of ceramic fibres is located between the steel casing 10 and the insulating boards 11. The overlying layer 14b is subjected to the hardening and protecting treatment indicated above.

The compositions and materials of the present invention have been subjected to considerable testing in industrial settings with favourable results as shown by the following Examples.

EXAMPLE 1

An 80 ft long, light-weight insulating trough was cast from the formulation suitable for large items as indicated above and subjected to the "SNF" treatment. The trough has been used (Alcan Guelph Works) for conveying molten aluminum for over two years with only minor repairs. Conventional non-insulating troughs in the same service had to be completely reconstructed after six-month service periods.

EXAMPLE 2

A 20 ft trough was cast from the formulation suitable for large items indicated above and subjected to the "SNF" treatment. The trough was in operation for over 3 months (Alcan Pickering Works) with only minute touch-up repairs before being accidentally destroyed.

Additionally, at the same location, large insulating casting tables (6×2×1 ft) made of the same material outperformed the previous best tables by a factor of 3–5 in terms of useful life.

EXAMPLE 3

Large 2 inch (internal diameter) "steady-eddy" diptubes/spouts were cast from the formulation suitable for large items as indicated above and were subjected to the "SNF" treatment. These diptubes/spouts out-performed similar diptubes cast from fused silica by a factor of 4–6 in terms of useful life (Alcan Arvida Works).

EXAMPLE 4

A 30 ft long lightweight insulating trough was cast from the formulation suitable for large items as indicated above and has been in continuous operation for conveying molten aluminum alloys for over 3 years with only minor repairs (Alcan Kingston Experimental Foundry). Such a long performance life is unusual and can be achieved by the materials of the present invention because of the simplicity and ease of repairs (i.e. patching) using the same compositions.

It has also been found that large experimental hottops of about 6 inch (internal diameter) made from the formulation suitable for large items and subjected to the "SNF" treatment cost only a fraction of the commercially available products for comparable service.

EXAMPLE 5

The life of control spouts and skimming plates in an aluminum foundry (Alcan Kitimat Works) has been increased by 5–10 times upon the application of the face-off formulation indicated above followed by the "SNF" treatment.

What we claim is:

1. A settable composition, which comprises a mixture of:
   ceramic fibers,
   natural wollastonite powder, and
   aqueous colloidal silica having a solids content of about 5–25% by wt.;
   wherein the weight ratio of the ceramic fibres to the wollastonite powder is 0.8–1.2:1.5–2.5, respectively, and wherein the amount of said aqueous colloidal silica relative to the amount of said wollastonite powder is about 1–1.4 ml per gram.

2. A composition according to claim 1 wherein the aqueous colloidal silica has a solids content in the range of about 10–17% by wt.

3. A composition according to claim 1 wherein the aqueous colloidal silica has a solids content in the range of about 12–15% by wt.

4. A composition according to claim 1 which additionally comprises vermiculite, wherein the weight ratio of the ceramic fibres:wollastonite:vermiculite is 0.8–1.2:1.5–2.5:0.25–0.75, respectively.

5. A composition according to claim 4 wherein the weight ratio of ceramic fibres:wollastonite:vermiculite is about 1:2:0.5, respectively.

6. A composition according to claim 1, which additionally comprises carbon fibres.

7. A composition according to claim 1, which additionally comprises 1 to 2% by weight of carbon fibres, base on the total weight of the composition.

8. A composition according to claim 1, which additionally comprises steel fibres.

9. A composition according to claim 1, which additionally comprises 3 to 5% by weight of steel fibers, base on the total weight of the composition.

10. A composition according to claim 1, having the following formulation:

| ceramic fibres | 250 g |
| wollastonite powder | 500 g |
| screened vermiculite | 100 g |
| colloidal silica | 500–600 ml |
| (12.5–15% solids by weight) | |
| carbon fibres | 10 g |

11. A material according to claim 1, having the following formulation:

| ceramic fibres | 250 g |
| wollastonite powder | 500 g |
| screened vermiculite | 100 g |
| colloidal silica | 600–700 ml |
| (12.5–15% solids by weight) | |
| steel fibres | 25 g |
| carbon fibres | 10 g |

12. A composition according to claim 1, having the following formulations:

| ceramic fibres | 250 g |
| wollastonite powder | 500 g |
| milled vermiculite | 100 g |
| colloidal silica | 500–700 ml |
| (12.5–15% solids by weight) | |
| steel fibres | 35 g |

13. A composition according to claim 1, having the following formulation:

| ceramic fibres | 250 g |
| wollastonite powder | 500 g |
| milled vermiculite | 100 g |
| colloidal silica | 500–700 ml |
| (12.5–15% solids by weight) | |

14. A refractory material obtained by hardening and drying a composition which comprises a mixture of:
ceramic fibres,
natural wollastonite powder, and
aqueous colloidal silica having a solids content of about 5–25% by wt.,
wherein the weight ratio of the ceramic fibres to the wollastonite powder is 0.8–1.2:1.5–2.5, respectively, and wherein the amount of said aqueous colloidal silica relative to the amount of said wollastonite powder is about 1–1.4 ml per gram.

15. A material according to claim 14 having a surface of increased resistance to chemical attack resulting from a surface treatment with a magnesium-silicon-fluoride solution.

16. A material according to claim 15 wherein the solution is an aqueous solution of $MgSiF_6.6H_2O$.

17. A material according to claim 16 wherein the solution contains about 250 g of $MgSiF_6.6H_2O$ per liter of water.

18. A material according to claim 14 having a surface of increased resistance to chemical attack resulting from a surface treatment with a refractory powder.

19. A material according to claim 18 wherein the refractory powder comprises milled aluminum silicate fibres, milled $\alpha$-$Al_2O_3$, natural wollastonite powder and kaolin, mixed with colloidal silica having a solids content of about 12–15% by weight.

20. A material according to claim 19 wherein the refractory powder comprises:

| milled aluminum silicate fibres | 1 part |
| milled $\alpha$-$Al_2O_3$ | 1 part |
| calcium silicate (wollastonite) | 1 part |
| kaolin | 0.3 part | and wherein the volume ratio of the above combined solids to the colloidal silica is about 1:1.

21. A material according to claim 14 having a surface of increased resistance to chemical attack resulting from a surface treatment with a refractory powder and a magnesium-silicon-fluoride solution.

22. A material according to claim 21 wherein the magnesium-silicon-fluoride solution is an aqueous solution of $MgSiF_6.6H_2O$.

23. A material according to claim 21 wherein the refractory powder comprises milled aluminum silicate fibres, milled $\alpha$-$Al_2O_3$, natural wollastonite powder and kaolin mixed with colloidal silica having a solids content of about 12–15% by weight.

24. A material according to claim 14 formed by allowing said composition to harden at about ambient temperature and then heating the hardened product to high temperature in order to dry the hardened product.

25. A material according to claim 14 in the form of a shaped article.

26. A settable composition, which consists essentially of a mixture of:
ceramic fibres,
natural wollastonite powder,
vermiculite,
aqueous colloidal silica having a solids content of about 5–25% by wt., and 0–5 wt% of reinforcing fibres selected from the group consisting of carbon fibres and steel fibres;
wherein the weight ratio of the ceramic fibres:wollastonite powder:vermiculite is 0.8–1.2:1.5–2.5:0–0.75, respectively, and wherein the amount of said aqueous colloidal silica relative to the amount of said wollastonite powder is about 1–1.4 ml per gram.

27. A composition according to claim 26 wherein the weight ratio of the ceramic fibres:wollastonite powder:vermiculite is 0.8–1.2:1.5–2.5:0.25–0.75, respectively.

* * * * *